United States Patent
Miyata

(10) Patent No.: US 8,419,049 B2
(45) Date of Patent: Apr. 16, 2013

(54) AIRBAG AND AIRBAG DEVICE

(75) Inventor: Yasuhito Miyata, Tokyo (JP)

(73) Assignee: Takata Corporation, Tokyo (JP)

( * ) Notice: Subject to any disclaimer, the term of this patent is extended or adjusted under 35 U.S.C. 154(b) by 209 days.

(21) Appl. No.: 12/882,461

(22) Filed: Sep. 15, 2010

(65) Prior Publication Data

US 2011/0068564 A1    Mar. 24, 2011

(30) Foreign Application Priority Data

Sep. 18, 2009 (JP) ................................. 2009-217550

(51) Int. Cl.
*B60R 21/233*    (2006.01)

(52) U.S. Cl.
USPC ........................................ 280/729; 280/743.2

(58) Field of Classification Search .................. 280/729, 280/743.2, 732
See application file for complete search history.

(56) References Cited

U.S. PATENT DOCUMENTS

| | | | |
|---|---|---|---|
| 5,945,184 A | 8/1999 | Nagata et al. | |
| 7,000,943 B2 * | 2/2006 | Hasebe et al. | 280/729 |
| 7,121,584 B2 * | 10/2006 | Hasebe et al. | 280/743.2 |
| 7,152,880 B1 * | 12/2006 | Pang et al. | 280/743.2 |
| 7,192,053 B2 * | 3/2007 | Thomas | 280/739 |
| 7,316,416 B2 * | 1/2008 | Hasebe et al. | 280/729 |
| 7,484,757 B2 * | 2/2009 | Thomas et al. | 280/743.2 |
| 7,540,534 B2 * | 6/2009 | Hasebe et al. | 280/743.1 |
| 7,597,347 B2 * | 10/2009 | Hasebe et al. | 280/729 |
| 7,648,158 B2 * | 1/2010 | Hasebe | 280/729 |
| 7,806,431 B2 * | 10/2010 | Yamada et al. | 280/730.1 |
| 7,841,622 B2 * | 11/2010 | Pausch et al. | 280/743.2 |
| 7,862,073 B2 * | 1/2011 | Thomas | 280/729 |
| 7,866,694 B2 * | 1/2011 | Hanawa et al. | 280/743.1 |
| 7,934,747 B2 * | 5/2011 | Miyata | 280/729 |
| 7,946,619 B2 * | 5/2011 | Mendez | 280/743.1 |
| 7,984,924 B2 * | 7/2011 | Yamada et al. | 280/743.2 |

(Continued)

FOREIGN PATENT DOCUMENTS

| | | |
|---|---|---|
| JP | S49-023176 B | 6/1974 |
| JP | H09-295545 A | 11/1997 |
| JP | 2006-176018 A | 7/2006 |
| JP | 2007-001471 A | 1/2007 |

*Primary Examiner* — Paul N Dickson
*Assistant Examiner* — Karen Jane Beck
(74) *Attorney, Agent, or Firm* — Fitch Even Tabin & Flannery, LLP

(57) ABSTRACT

To provide an airbag and an airbag device that is excellent in an impact absorbing force and can efficiently inflate and deploy the airbag. An airbag 1 according to the present invention includes a left inflation chamber 11L that is inflated and deployed on the front left side of a passenger P and a right inflation chamber 11R that is inflated and deployed on the front right side of the passenger P. The left inflation chamber 11L and the right inflation chamber 11R include a first communication path 12 formed at an end portion on the car body side, a connection portion 13 connected at an intermediate portion in the inflating and deploying direction, and a second communication path 14 formed within the connection portion 13. The airbag further includes a first tether 3 having one end connected to each inner face of the left inflation chamber 11L and the right inflation chamber 11R and the other end connected into the connection portion 13 and a second tether 4 having one end connected the inner faces in the vicinity of top portions of the left inflation chamber 11L and the right inflation chamber 11R and the other end connected into the connection portion 13.

9 Claims, 9 Drawing Sheets

U.S. PATENT DOCUMENTS

| | | | |
|---|---|---|---|
| 8,181,988 B2 * | 5/2012 | Adachi et al. | 280/729 |
| 8,186,715 B2 * | 5/2012 | Miyata | 280/743.2 |
| 2004/0164526 A1 * | 8/2004 | Hasebe et al. | 280/729 |
| 2005/0104339 A1 * | 5/2005 | Hasebe et al. | 280/729 |
| 2006/0066089 A1 * | 3/2006 | Hasebe et al. | 280/743.1 |
| 2006/0186647 A1 * | 8/2006 | Bosch | 280/729 |
| 2007/0024032 A1 * | 2/2007 | Hasebe | 280/729 |
| 2009/0085331 A1 * | 4/2009 | Bito | 280/728.2 |
| 2010/0102542 A1 * | 4/2010 | Nakajima et al. | 280/743.2 |
| 2011/0025024 A1 * | 2/2011 | Choi | 280/728.2 |
| 2011/0068564 A1 * | 3/2011 | Miyata | 280/729 |
| 2012/0068446 A1 * | 3/2012 | Miyata et al. | 280/743.2 |
| 2012/0119475 A1 * | 5/2012 | Choi et al. | 280/729 |

* cited by examiner

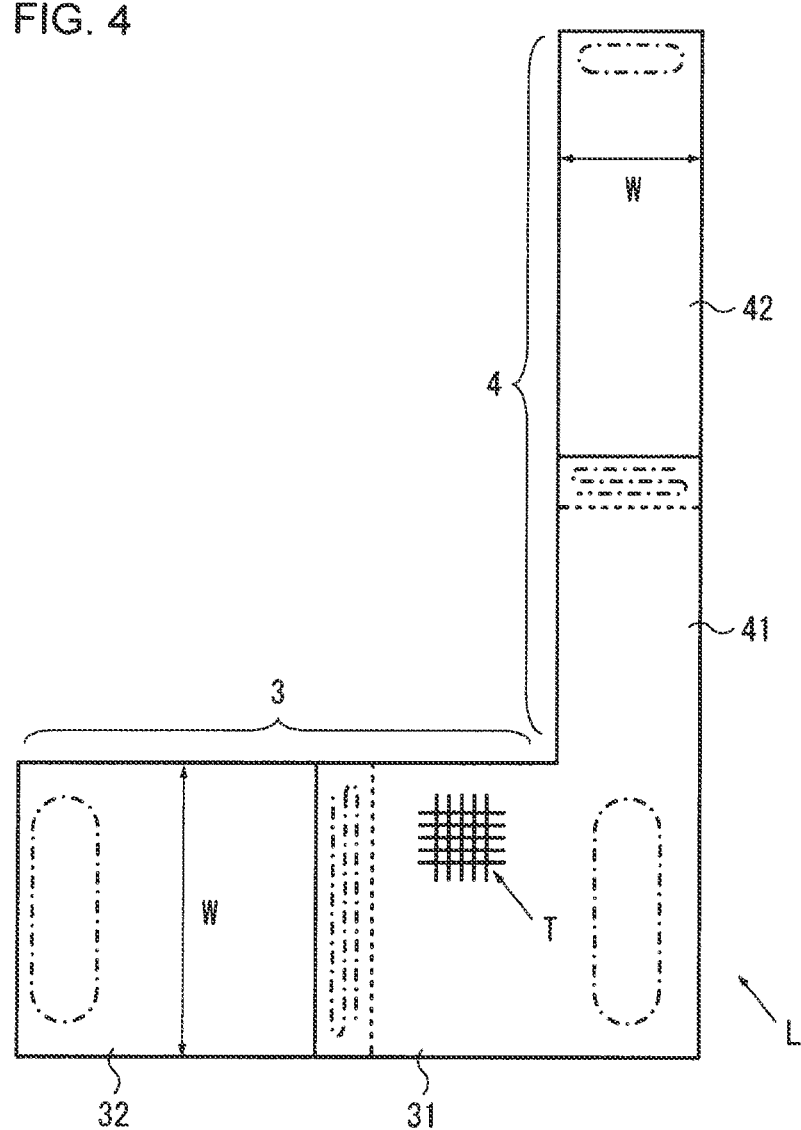

AIRBAG AND AIRBAG DEVICE

CROSS-REFERENCE TO RELATED APPLICATION

This application claims priority under 35 U.S.C. §119 to Japanese Patent Application No. JP2009-217550 filed on Sep. 18, 2009, the entire content of which is hereby incorporated herein by reference in its entirety.

FIELD OF THE INVENTION

The present invention relates to an airbag and an airbag device to be mounted on a vehicle such as an automobile and particularly to an airbag and an airbag device suitable for a so-called twin bag.

BACKGROUND OF THE INVENTION

It has become common to mount an airbag device to absorb an impact occurring on a passenger in vehicles such as an automobile by inflating and deploying an airbag in a vehicle at a collision, rapid deceleration or the like. Various types of the airbag devices have been developed/employed, such as a driver airbag device built in a steering, a passenger airbag device built in an instrument panel, a side airbag device built in a side portion of a vehicle or in a seat, a curtain airbag device built in an upper part of a door and a knee airbag device corresponding to a knee portion of a passenger.

These airbag devices generally have an airbag which is folded normally and inflated and deployed in an emergency and an inflator that supplies gas to the airbag. Especially since the passenger compartment has a wide space for inflation and people with various body types such as children, adult women, adult men are seated on the passenger seat, a capacity of the airbag, a speed of the inflation and deployment, an internal pressure of the airbag, a balance of an impact absorbing force and the like need to be considered. In view of such demand, an airbag as described in Japanese Unexamined Patent Application Publication No. 2007-1471 has been already proposed.

Japanese Unexamined Patent Application Publication No. 2007-1471 discloses an airbag, known as a twin bag, having a left airbag section that is inflated and deployed on the left front side of a passenger and a right airbag section that is inflated and deployed on the right front side of the passenger. The end portions of the left airbag section and the right airbag section are not connected to each other so that a space portion opened toward the passenger is formed between the end portions of the left airbag section and the right airbag section in the inflated and deployed state. Intermediate portions in the inflating and deploying direction of the left airbag section and the right airbag section are connected to each other by a connection portion. The connection portion is disposed lower than the middle in the vertical direction of the left airbag section and the right airbag section. In the left airbag section and the right airbag section, a tether for regulating the width that regulates the width in the width direction of each section in the inflated and deployed state is disposed.

The above-described twin bag can restrain the shoulder portion of a passenger by the airbag and can also receive the head portion so as to sandwich from both right and left sides, thereby having excellent passenger retraining force and impact absorbing force. However, the demand for the airbag has been increased recently, and there are problems that the impact absorbing force is to be improved and the airbag is to be inflated and deployed more efficiently.

SUMMARY OF THE INVENTION

The present invention was made in view of the above problems and an object thereof is to provide an airbag and an airbag device that has excellent impact absorbing force and can inflate the airbag efficiently.

According to the present invention, an airbag is provided. The airbag includes a left inflation chamber that is inflated and deployed on the front left side of a passenger and a right inflation chamber that is inflated and deployed on the front right side of the passenger from a car body upon supply of gas into the insides. The left inflation chamber and the right inflation chamber include a first communication path formed at an end portion of the car body side, a connection portion connected at an intermediate portion in the inflating and deploying direction, and a second communication path formed within the connection portion. The airbag further includes a first tether having one end connected to each inner face of the left inflation chamber and the right inflation chamber and the other end connected into the connection portion and a second tether having one end connected to inner faces in the vicinity of the top portions in the left inflation chamber and the right inflation chamber and the other end connected into the connection portion or directly connected so as to pass through the second communication path.

Furthermore, according to the present invention, an airbag device having an airbag which is folded normally and inflated and deployed in an emergency and an inflator that supplies gas to the airbag is provided. The airbag device includes the airbag having a left inflation chamber that is inflated and deployed on the front left side of a passenger and a right inflation chamber that is inflated and deployed on the front right side of the passenger from a car body upon supply of gas into the insides. The left inflation chamber and the right inflation chamber include a first communication path formed at an end portion of the car body side, a connection portion connected at an intermediate portion in the inflating and deploying direction, and a second communication path formed within the connection portion. The airbag further includes a first tether having one end connected to each inner face of the left inflation chamber and the right inflation chamber and the other end connected into the connection portion and a second tether having one end connected to inner faces in the vicinity of top portions of the left inflation chamber and the right inflation chamber and the other end connected into the connection portion or directly connected so as to pass through the second communication path.

A third communication path, which is separate from the second communication path, is formed within the connection portion, and at least the other end of the first tether may be connected to a bridge portion formed between the second communication path and the third communication path. The bridge portion is formed with a height range of ¼ to ¾ of the height of the airbag after inflation and deployment, for example.

The second tether has one end connected to the inner faces on outer shell sides of the left inflation chamber and the right inflation chamber and also connected to a range of 80 to 250 mm from outer-peripheral sewn portions of the left inflation chamber and the right inflation chamber, for example.

In the above-described airbag and the airbag device, the first tether and the second tether may be constituted by each side of a base cloth formed in the L shape.

Additionally, the first tether or the second tether may be formed by using a remaining part of the base cloth in the connection portion when the second communication path or the third communication path is formed.

The connection portion may be formed having a dent substantially at the center of the sewn portion on the passenger side or may be formed so that a gap from the outer-peripheral sewn portions of the left inflation chamber and the right inflation chamber gets wider from below to above.

The first communication path and the second communication path may form a substantially doughnut-shaped gas communication path.

According to the airbag and the airbag device of the above-described present invention, gas fluidity in the airbag can be improved, the airbag can be rapidly inflated and deployed and a passenger can be received softly by connecting the left inflation chamber and the right inflation chamber of the so-called twin bag to form the second communication path. Moreover, the inflated and deployed shape of the airbag can be regulated, the inflation and deployment in the lateral width (right and left) direction of the airbag and flattening of a valley part of the twin bag can be restricted, and even an airbag with a large capacity can be rapidly inflated and deployed to a desired shape by arranging the first tether and the second tether.

Additionally, the gas fluidity can be further improved by forming the third communication path. Not only can the bridge portion be used as a portion to connect the first tether and the second tether but also it can be used as a tether that regulates the inflated and deployed shape of the airbag in the inflating and deploying direction. Moreover, the first tether and the second tether can be connected to a position where the inflated and deployed shape of the airbag can be easily regulated by forming the bridge portion at a predetermined position.

Furthermore, the inflated and deployed shape of the airbag can be effectively regulated by connecting the second tether within a predetermined range. The sewn portions to the connection portion can be collected at one spot to arrange the tethers efficiently by forming the first tether and the second tether in the L shape.

Moreover, the base cloth can be effectively utilized to reduce the cost by forming the first tether and the second tether from the remaining part of the connection portion.

The passenger can be received softly and the impact absorbing force can be improved by forming the sewn portion on the passenger side of the connection portion in a predetermined shape.

The function as the airbag can be performed even at the center part of a gas communication path by forming the path in a substantially doughnut shape. For example, a passenger closer to an instrument panel can be restrained at the center part of the airbag, so that the function of the entire airbag can be improved.

BRIEF DESCRIPTION OF THE DRAWINGS

FIG. 2 is an illustration of the airbag shown in FIG. 1 in which

FIG. 3 is an illustration of the airbag shown in FIG. 1 in which

FIG. 4 is a plan view illustrating a configuration of a first tether and a second tether.

FIG. 5 is an illustration of a mounting position of the first tether and the second tether to a connection portion in which

FIG. 6 is an illustration of a mounting position of the second tether to an inner face of the airbag in which

FIG. 7 is a sectional view illustrating variations of the first tether and the second tether in which

FIG. 8 is an illustration of other variations of the first tether and the second tether in which

FIG. 9 is a side view illustrating variations of the connection portion in which

DETAILED DESCRIPTION OF THE PREFERRED EMBODIMENTS

Figure 1:
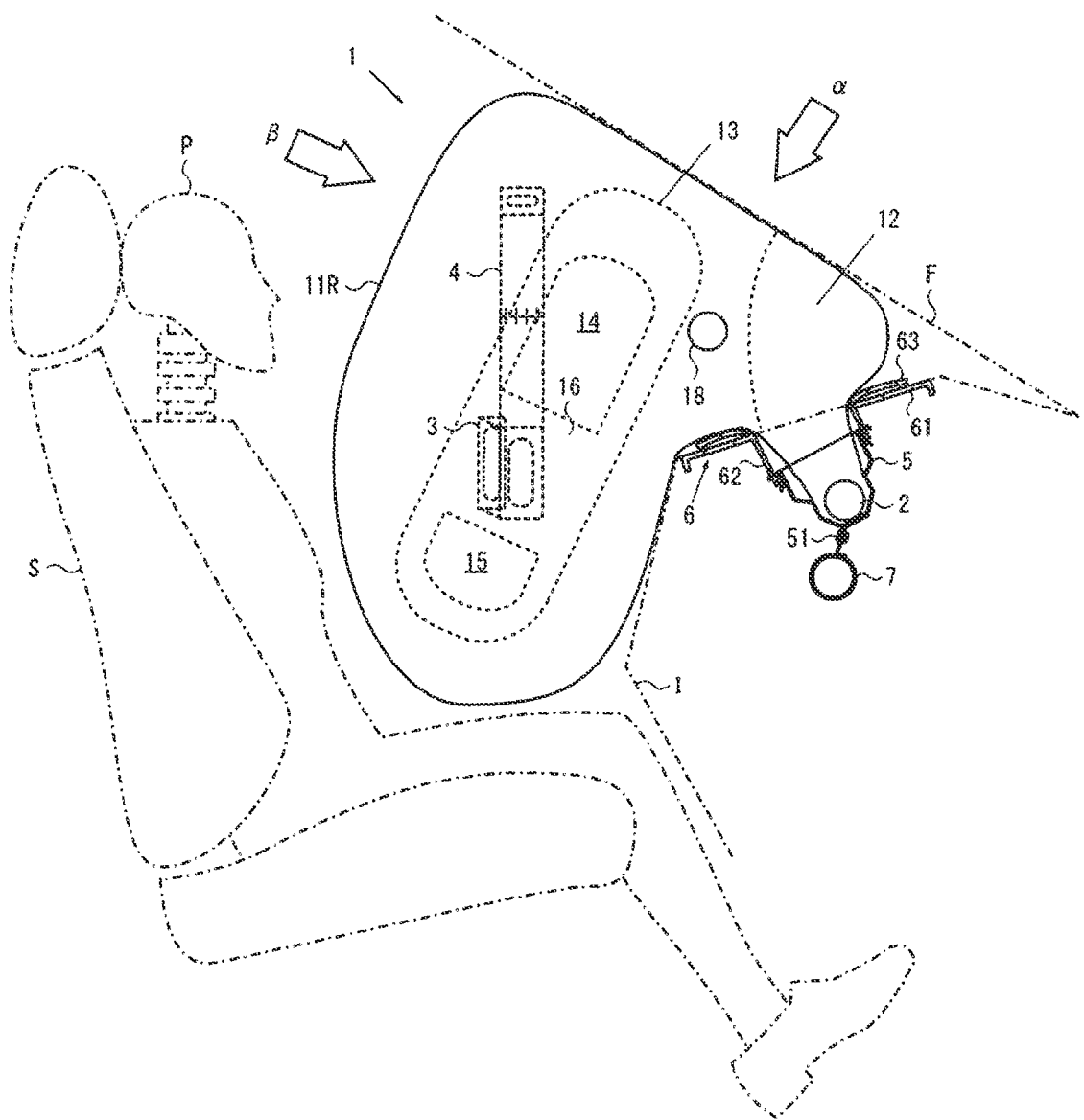
FIG. 1 is a general configuration view of a first embodiment of an airbag device according to the present invention showing an airbag in the inflated and deployed state.
Figure 2A:
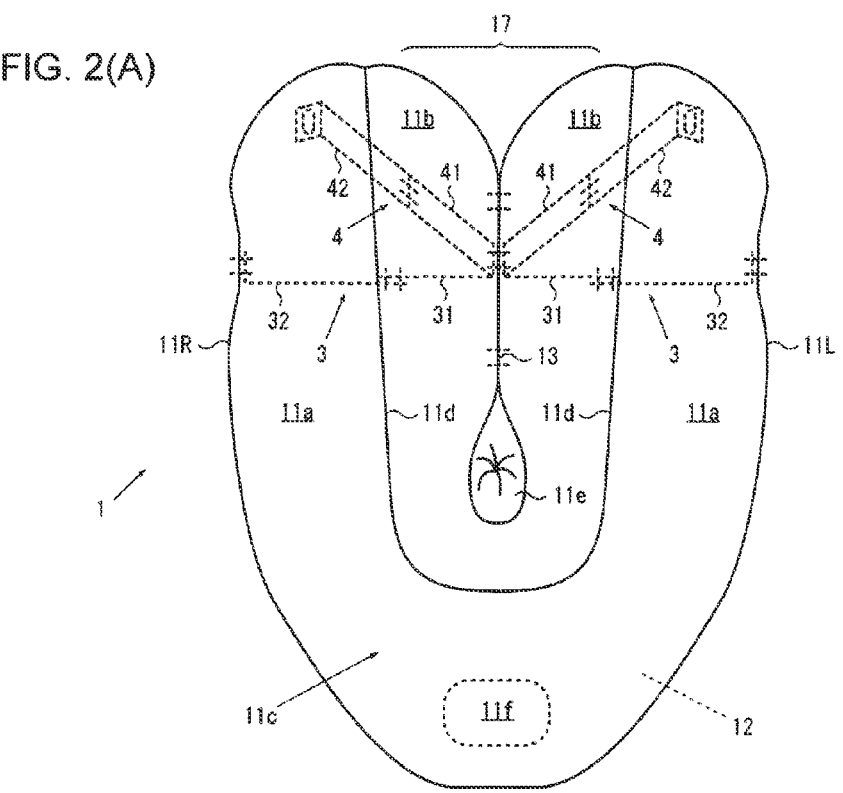
FIG. 2(A) is a view in the direction of the arrow α in FIG. 1
Figure 2B:
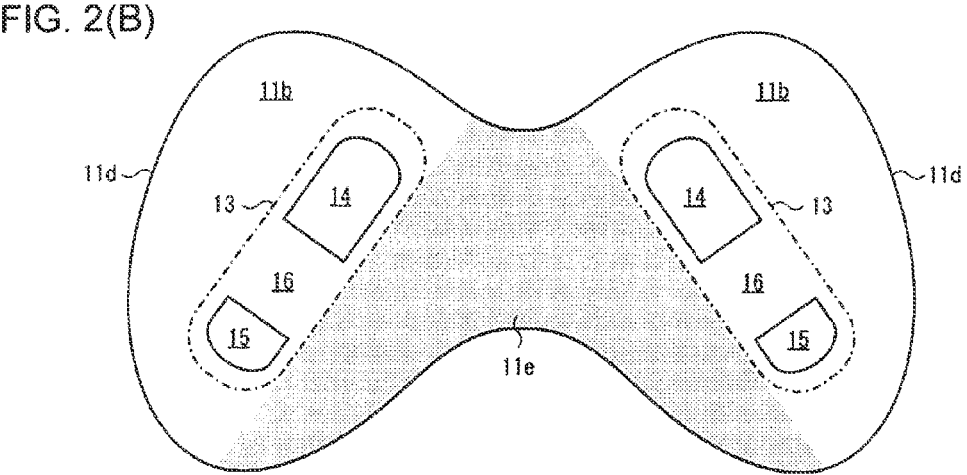
FIG. 2(B) is a developed diagram of a base cloth of an internal shell.
Figure 3A:
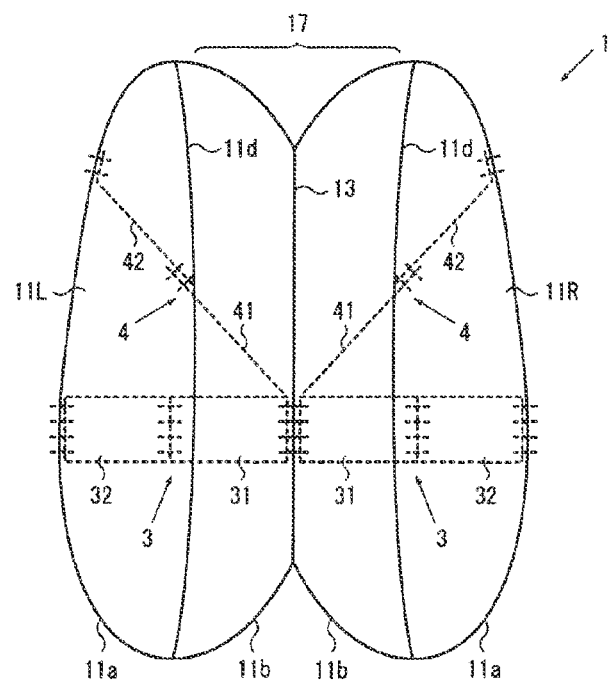
FIG. 3(A) is a view in the direction of the arrow β in FIG. 1
Figure 3B:
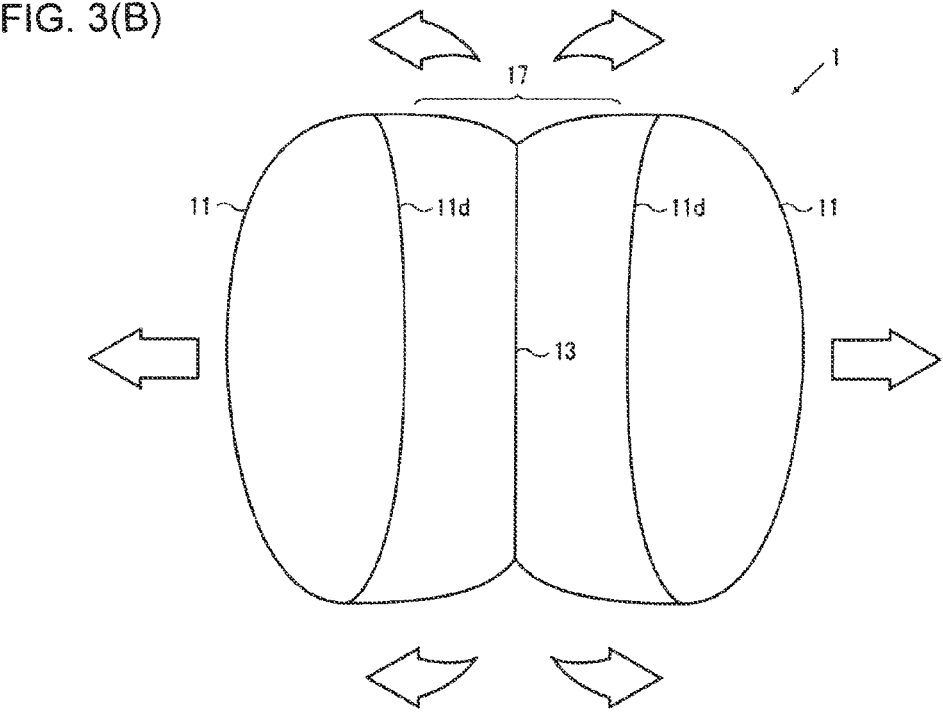
FIG. 3(B) is a reference drawing.

Referring to FIGS. 1 to 9, embodiments of the present invention will be described below. FIG. 1 is a general configuration view of a first embodiment of an airbag device according to the present invention showing an airbag in the inflated and deployed state. FIG. 2 is an illustration of the airbag shown in FIG. 1 in which FIG. 2(A) is a view in the direction of the arrow a in FIG. 1 and FIG. 2(B) is a developed diagram of a base cloth of an internal shell. And FIG. 3 is an illustration of the airbag shown in FIG. 1 in which FIG. 3(A) is a view in the direction of the arrow β in FIG. 1 and FIG. 3(B) is a reference drawing.

As shown in FIGS. 1 and 2(A), the first embodiment of the airbag device according to the present invention includes an airbag 1 which is folded normally and inflated and deployed in an emergency and an inflator 2 that supplies gas to the airbag 1. The airbag 1 has a left inflation chamber 11L that is inflated and deployed on the front left side of a passenger P and a right inflation chamber 11R that is inflated and deployed on the front right side of the passenger P from the car body upon supply of gas into the insides. The left inflation chamber 11L and the right inflation chamber 11R include a first communication path 12 formed at an end portion of a car body side, a connection portion 13 connected at an intermediate portion in the inflating and deploying direction, and a second communication path 14 formed within the connection portion 13. The airbag further includes a first tether 3 having one end connected to each inner face of the left inflation chamber 11L and the right inflation chamber 11R and the other end connected into the connection portion 13 and a second tether 4 having one end connected to inner faces in the vicinity of the top portions in the left inflation chamber 11L and the right inflation chamber 11R and the other end connected into the connection portion 13.

In the first embodiment shown in FIG. 1, a third communication path 15, which is separate from the second communication path 14, is formed within the connection portion 13, and the other ends of the first tether 3 and the second tether 4 are connected to a bridge portion 16 formed between the second communication path 14 and the third communication path 15. The passenger P shown in FIG. 1 is a dummy doll simulating an adult woman sitting on a seat S.

The above-described airbag device is known as a passenger airbag device. The airbag 1 is inflated and deployed in a space surrounded by the passenger P, a front windshield F and an instrument panel I. Such airbag device is generally built in the instrument panel I disposed on the front face of the passenger seat. Specifically, the airbag device includes a retainer 5 that contains the airbag 1 and an airbag cover 6 that locks the retainer 5 and forms an interior face of a vehicle.

Referring to FIG. 1, the airbag 1 is shown in the inflated and deployed state. The surface of the airbag cover 6 forms a part of the instrument panel I before inflation and deployment of the airbag 1. The airbag cover 6 includes a plate-shaped portion 61 that forms the interior face of the vehicle and an inner case 62 that is disposed on the rear face of the plate-shaped portion 61 and forms an inflation path of the airbag 1. A door portion 63 is formed in the plate-shaped portion 61 so as to be torn upon inflation and deployment of the airbag 1.

The retainer 5 is locked to a locking hole formed in the inner case 62 by a hook connected to the side face portion. The retainer 5 is also connected to a fixing member 7 through a bonding member 51. The configuration of the inflator 2, the retainer 5, the bonding member 51, the airbag cover 6, and the fixing member 7 is not limited to that illustrated and conventional configurations can be used.

As shown in FIGS. 2(A) and 3(A), the airbag 1 has a twin bag shape with the left inflation chamber 11L and the right inflation chamber 11R. The bag shape is formed by sewing and bonding a base cloth constituting an outer shell 11a and an inner shell 11b. The sewn portions between the outer shell 11a and the inner shell 11b are referred to as outer-peripheral sewn portions 11d. As shown in FIG. 1, a vent hole 18 may be formed in the outer shells 11a of the left inflation chamber 11L and the right inflation chamber 11R.

As shown in FIG. 2(B), the inner shells 11b of the left inflation chamber 11L and the right inflation chamber 11R comprise a base cloth having a dented center. Opening portions are formed in the both right and left faces of the inner shell 11b to constitute the second communication path 14 and the third communication path 15, and the bridge portion 16 is formed between the second communication path 14 and the third communication path 15. The inner shells 11b are sewn and bonded along the connection portion 13 surrounding the outer peripheries of the second communication path 14 and the third communication path 15 while the right and left second communication paths 14 and the right and left third communication paths 15 are overlapped with each other. At this time, an intermediate portion 11e shaded in the figure is formed cylindrically. As shown in FIG. 2(A), a valley portion 17 is formed by the connection portion 13 between the left inflation chamber 11L and the right inflation chamber 11R.

As shown in FIG. 2(A), the space surrounded by the intermediate portion 11e and a base end portion 11c of the airbag 1 forms the first communication path 12. An opening portion 11f to which the inflator 2 is connected is formed in a bottom part of the base end portion 11c. Therefore, gas released from the inflator 2 is supplied to the left inflation chamber 11L and the right inflation chamber 11R through the first communication path 12. The first communication path 12, the second communication path 14 and the third communication path 15 form a doughnut-shaped gas communication path, since the left inflation chamber 11L and the right inflation chamber 11R communicate with each other through the second communication path 14 and the third communication path 15. As described above, gas fluidity in the airbag 1 can be improved by making the left inflation chamber 11L and the right inflation chamber 11R of the twin bag communicate with each other, and thus the airbag 1 can be rapidly inflated and deployed, and the passenger P can be received softly.

The cylindrically formed intermediate portion 11e of the inner shell 11b forms a center part of the substantially doughnut-shaped gas communication path. As shown in FIG. 2(A), the center part is narrowed by the base cloth forming the intermediate portion 11e when the airbag 1 is inflated and deployed. The function as the airbag 1 can be performed at the center part, since the center part forms a cylindrical opening portion that vertically penetrates the airbag 1. For example, the head portion of the passenger P close to the instrument panel I can be covered by the airbag 1 from above and the passenger P can be wrapped by the center part formed by the intermediate portion 11e, so that the function of the entire airbag 1 can be improved.

As shown in FIG. 3(B), if no means to regulate the inflated and deployed shape of the airbag 1, such as a tether, is used, the airbag 1 is inflated and deployed in the lateral width (right and left) direction, the valley portion 17 is flattened, and the airbag 1 is to be inflated and deployed in the shape close to a sphere. In this case, the airbag 1 is inflated and deployed in the lateral width (right and left) direction, thereby shortening a distance that the airbag 1 reaches in the inflating and deploying direction. In the present invention, the first tether 3 and the second tether 4 that regulate the inflated and deployed shape of the airbag 1 are disposed inside the airbag 1.

As shown in FIGS. 2(A) and 3(A), the first tether 3 is a tether that regulates lateral widths of the left inflation chamber 11L and the right inflation chamber 11R. One end of the first tether 3 is connected to each inner face of the left inflation chamber 11L and the right inflation chamber 11R, while the other end of the first tether 3 is connected to the bridge portion 16 formed within the connection portion 13. For example, the first tether 3 comprises an outer first tether 32 forming one end and an inner first tether 31 forming the other end. As described above, the airbag 1 can be sewn easily by dividing the first tether 3 into two parts at the intermediate portion.

As shown in FIGS. 2(A) and 3(A), the second tether 4 is a tether that regulates the shape of the valley portion 17 of the airbag 1. One end of the second tether 4 is connected to the inner faces in the vicinity of the top portions of the left inflation chamber 11L and the right inflation chamber 11R, while the other end of the second tether 4 is connected to the bridge portion 16 formed within the connection portion 13. For example, an outer second tether 42 forming one end side and the second tether 4 comprises an inner second tether 41 forming the other end side. As described above, the airbag 1 can be sewn easily by dividing the second tether 4 into two parts at the intermediate portion.

FIG. 4 is a plan view illustrating the configuration of the first tether 3 and the second tether 4. As shown in FIG. 4, the inner first tether 31 and the inner second tether 41 are constituted by each side of one base cloth L formed in the L shape, and to each end portion thereof, the outer first tether 32 and the outer second tether 42 are sewn so as to form the substantially L shape in the entirety. Both the inner first tether 31 and the inner second tether 41 can be sewn in a single sewing process by forming the inner first tether 31 and the inner second tether 41 from the one base cloth L, so that the work can done efficiently.

The width W of the first tether 3 and the second tether 4 is set in a range of 50 to 160 mm or preferably in a range of 70 to 120 mm. This width W is selected as appropriate according to conditions such as a capacity, an internal pressure of the airbag 1. The case in which the width W of the first tether 3 is larger than the width W of the second tether 4 is illustrated, but not limited to such a shape, they may be formed with the same width W or the width W of the second tether 4 may be formed larger than the width W of the first tether 3.

A texture T of the first tether 3 and the second tether 4 is set, for example, in a stretching direction of the first tether 3 and the second tether 4. Such texture T can prevent the tethers from stretching upon inflation and deployment of the airbag 1 to provide the shape of the airbag 1 with stability upon inflation and deployment. It is needless to say that the texture T may be inclined with respect to the stretching direction of the tether depending on the conditions such as thickness, stretching rate, density of the weaving yarn.

Figure 5A:
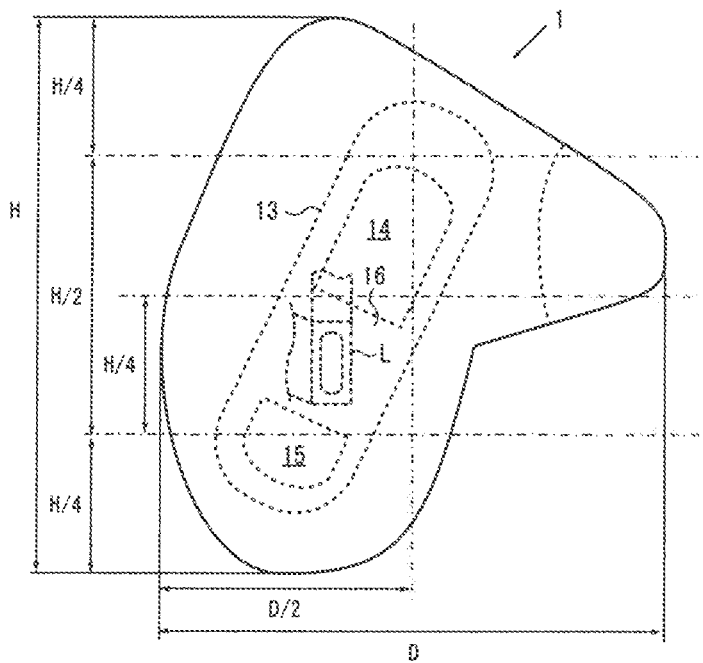
FIG. 5(A) shows a first embodiment and FIG. 5(B) shows a variation.
Figure 5B:
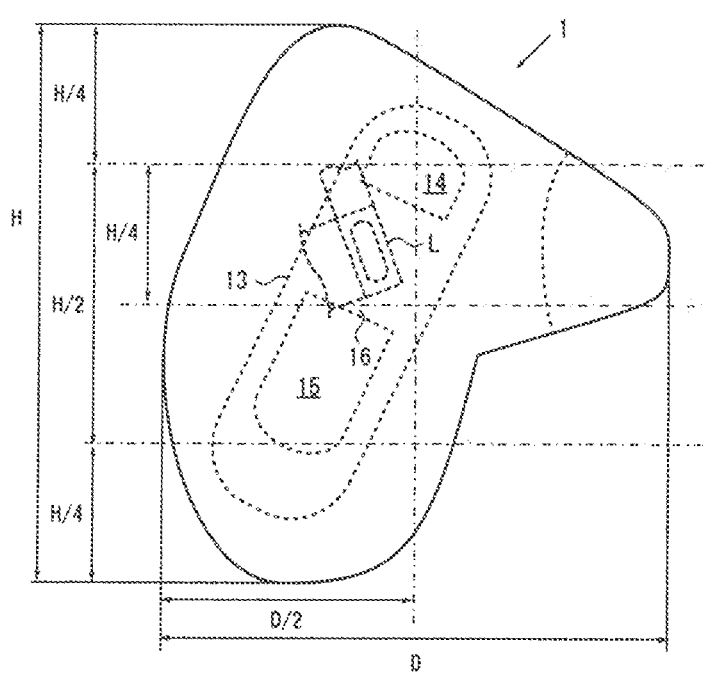
Figure 6A:
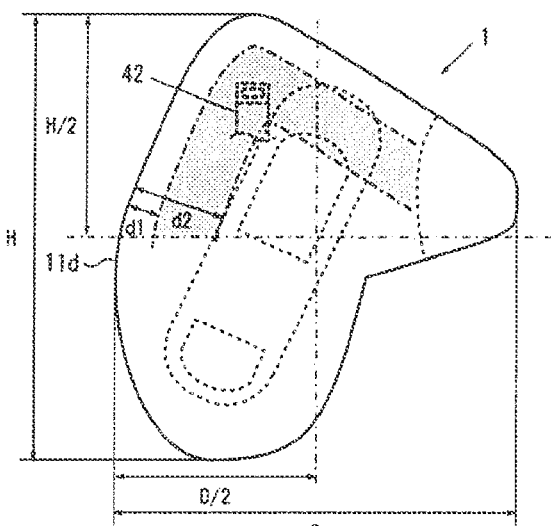
FIG. 6(A) shows a first embodiment.
Figure 6B:
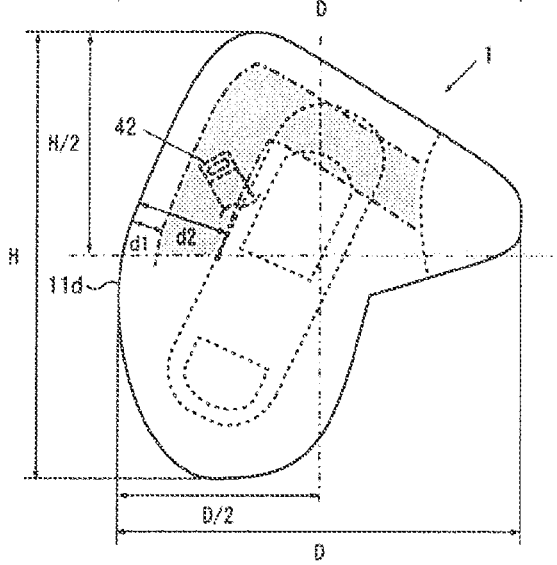
FIG. 6(B) shows a first variation.
Figure 6C:
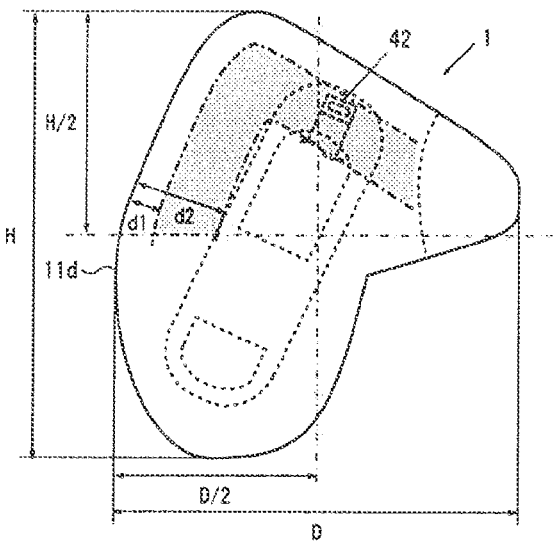
FIG. 6(C) shows a second variation.

Next, mounting positions of the first tether 3 and the second tether 4 will be described. FIG. 5 is an illustration of the mounting positions of the first tether 3 and the second tether 4 to the connection portion 13 in which FIG. 5(A) shows the first embodiment and FIG. 5(B) shows a variation. FIG. 6 is an illustration of the mounting position of the second tether 4 to the inner face of the airbag 1 in which FIG. 6(A) shows the first embodiment. FIG. 6(B) shows a first variation, and FIG. 6(C) shows a second variation.

In the first embodiment shown in FIG. 5(A), the bridge portion 16 is formed in a range of H/4 to H/2 from below with respect to a height H of the airbag 1 after inflation and deployment. Therefore, the base cloth L constituting the inner first tether 31 and the inner second tether 41 in the first embodiment is disposed in the range of H/4 to H/2 from below of the airbag 1 after inflation and deployment. The bridge portion 16 is formed in a range of D/2 from the passenger P side to a depth D of the airbag 1 after inflation and deployment. Therefore, the base cloth L constituting the inner first tether 31 and the inner second tether 41 in the first embodiment is disposed in the range of D/2 from the passenger P side of the airbag 1 after inflation and deployment.

In the variation shown in FIG. 5(B), the bridge portion 16 is formed in the range of H/2 to 3H/4 from below to the height H of the airbag 1 after inflation and deployment and is formed in the range of D/2 from the passenger P side to the depth D of the airbag 1 after inflation and deployment. Therefore, the base cloth L constituting the inner first tether 31 and the inner second tether 41 in the variation is arranged in the range of H/2 to 3H/4 from below the airbag 1 after inflation and deployment and in the range of D/2 from the passenger P side of the airbag 1 after inflation and deployment.

According to the first embodiment shown in FIG. 5(A) and the variation shown in FIG. 5(B), the bridge portion 16 is preferably formed in the range of H/4 to 3H/4 from below to the height H of the airbag 1 after inflation and deployment, and the base cloth L constituting the inner first tether 31 and the inner second tether 41 is preferably disposed in the bridge portion 16.

In the first embodiment shown in FIG. 6(A), the outer second tether 42 constituting the second tether 4 has one end connected to the inner faces on the outer shell 11a sides of the left inflation chamber 11L and the right inflation chamber 11R and disposed in a range of d1 to d2 (shaded range) from the outer-peripheral sewn portions 11d of the left inflation chamber 11L and the right inflation chamber 11R. For example, d1 is set to 80 mm and d2 to 250 mm. The valley portion 17 can be effectively prevented from flattening by connecting one end of the outer second tether 42 in such a range. Furthermore, the impact absorbing force can be effectively improved by limiting the mounting position of the one end of the outer second tether 42 to the range of H/2 from above to the height H of the airbag 1 after inflation and deployment and to the range of D/2 from the passenger P side to the depth D of the airbag 1 after inflation and deployment.

In the first variation shown in FIG. 6(B), the one end of the outer second tether 42 is disposed at a position closer to the passenger P and lower than that in the first embodiment shown in FIG. 6(A). Such first variation is effective if an extended amount of the airbag 1 to the passenger P side is large or the valley portion 17 is deep.

In the second variation shown in FIG. 6(C), the one end of the outer second tether 42 is disposed at a position closer to the car body than that in the first embodiment shown in FIG. 6(A). Such second variation is effective if an extended amount of the airbag 1 to the passenger P side is small or if the valley portion 17 is shallow.

As described above, the mounting position of the one end of the second tether 4 (outer second tether 42) can be set as appropriate according to the conditions such as the shape of the airbag 1, the shape of the valley portion 17, the capacity, the internal pressure of the airbag 1, and in some cases, it may be set exceeding the range of D/2 from the passenger P side to the depth D of the airbag 1 after inflation and deployment as shown in FIG. 6(C).

Figure 7A:
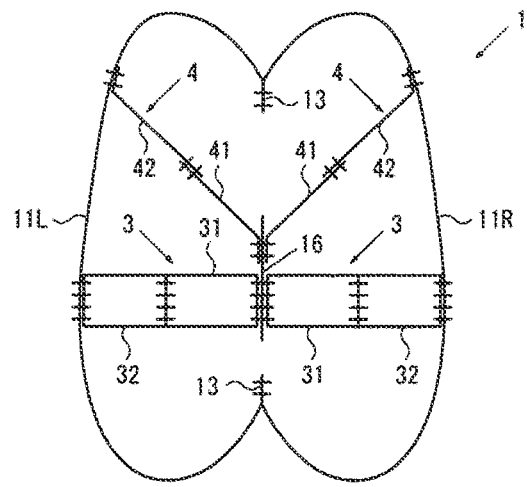
FIG. 7(A) shows a first variation.
Figure 7B:
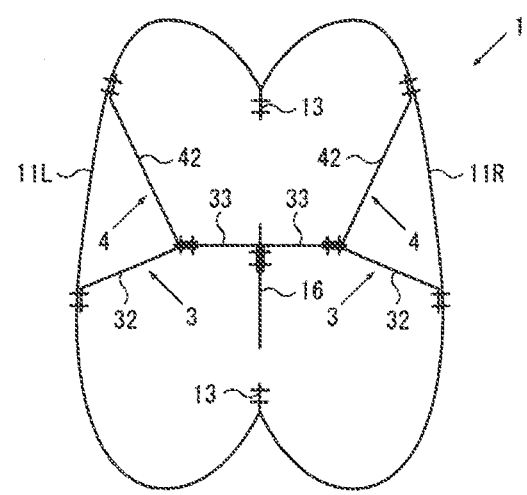
FIG. 7(B) shows a second variation.
Figure 7C:
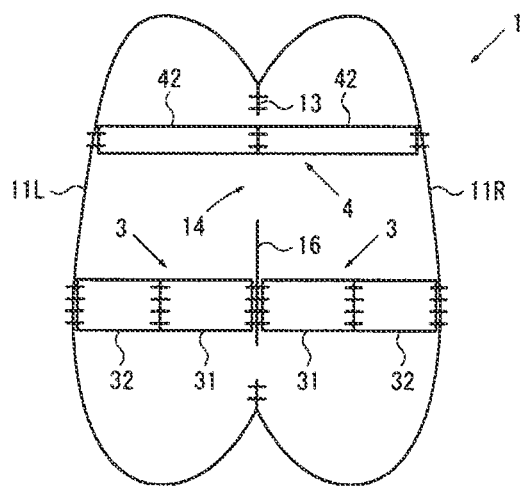
FIG. 7(C) shows a third variation.
Figure 8A:
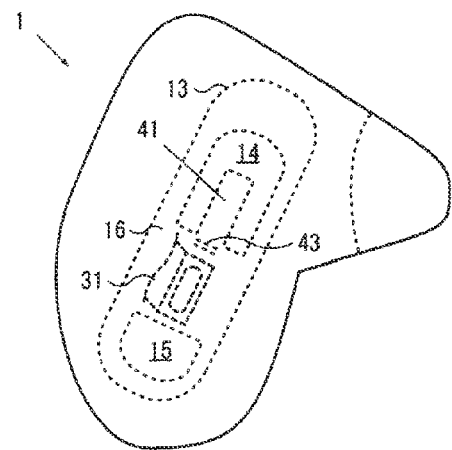
FIG. 8(A) shows a side view of a fourth variation.
Figure 8B:
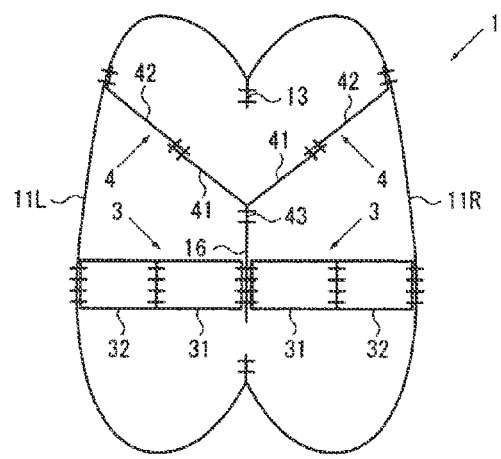
FIG. 8(B) shows a sectional view of the fourth variation.
Figure 8C:
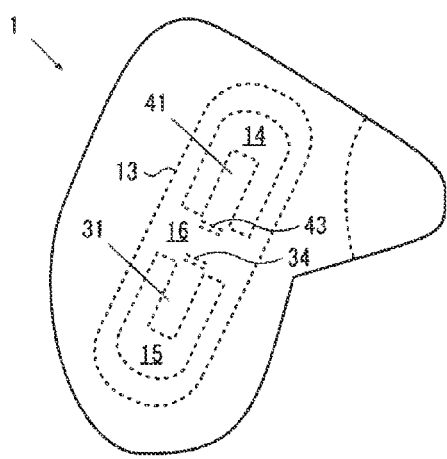
FIG. 8(C) shows a side view of a fifth variation.
Figure 8D:
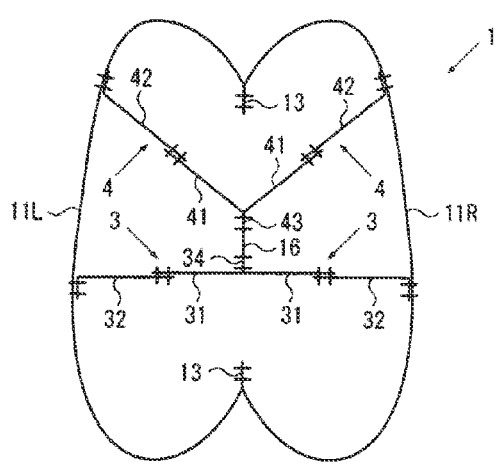
FIG. 8(D) shows a sectional view of the fifth variation.

Next, a variation of the first tether 3 and the second tether 4 will be described. FIG. 7 is a sectional view illustrating the variation of the first tether and the second tether, in which FIG. 7(A) shows a first variation, FIG. 7(B) shows a second variation, and FIG. 7(C) shows a third variation. FIG. 8 is an illustration of other variations of the first tether and the second tether in which FIG. 8(A) shows a side view of a fourth variation, FIG. 8(B) shows a sectional view of the fourth variation, FIG. 8(C) shows a side view of a fifth variation, and FIG. 8(D) shows a sectional view of the fifth variation.

The first variation of the tether configuration shown in FIG. 7(A) is configured so that the inner first tether 31 and the inner second tether 41 are separated, formed by separate base cloths and sewn to the bridge portion 16 of the connection portion 13, respectively. The inflated and deployed shape of the airbag 1 can be regulated similarly to the first embodiment also by this configuration.

The second variation of the tether configuration shown in FIG. 7(B) is configured so that the inner first tether 31 and the inner second tether 41 shown in the first embodiment are constituted by one rectangular base cloth (inner tether 33), the outer first tether 32 and the outer second tether 42 are sewn to one end of the inner tether 33, and the other end of the inner tether 33 is sewn to the bridge portion 16 in the connection portion 13. The inflated and deployed shape of the airbag 1 can be regulated similarly to the first embodiment also by this configuration, thereby reducing usage of the base cloth and the cost.

The third variation of the tether configuration shown in FIG. 7(C) is configured such that, in the first variation shown in FIG. 7(A), one end of the outer second tether 42 (second tether 4) is connected to the left inflation chamber 11L and the right inflation chamber 11R, and the other end of the outer second tether 42 (second tether 4) is directly connected so as to pass through the second communication path 14. According to this configuration, the intermediate portion of the second tether 4 is locked to the connection portion 13 upon inflation and deployment of the airbag 1 and pulled substantially in the V shape, whereby the outer shells 11a of the left inflation chamber 11L and the right inflation chamber 11R can be pulled downward inside and the inflated and deployed shape of the airbag 1 can be regulated.

The fourth variation of the tether configuration shown in FIGS. 8(A) and 8(B) is configured so that the inner second tether 41 of the second tether 4 is formed by using a remaining part of the base cloth in the connection portion 13 when the second communication path 14 is formed. A root portion 43 of the inner second tether 41 is preferably sewn so as to make the length of the inner second tether 41 stable. According to this configuration, as shown in FIG. 8(B), the inner second tether 41 can be extended substantially in the Y shape from the bridge portion 16, whereby the base cloth can be effectively utilized to reduce the cost. In FIG. 8(A), the state prior to connecting the inner second tether 41 and the outer second tether 42 is shown for convenience of the explanation.

The fifth variation of the tether configuration shown in FIGS. 8(C) and 8(D) is configured so that, in addition to the fourth variation, the inner first tether 31 of the first tether 3 is formed by using the remaining part of the base cloth in the connection portion 13 when the third communication path 15 is formed. A root portion 34 of the inner first tether 31 is preferably sewn so as to make the length of the inner first tether 31 stable. According to this configuration, as shown in FIG. 8(D), the inner first tether 31 can be extended substantially in the T shape (or substantially in the Y shape in some cases) from the bridge portion 16, whereby the base cloth can be utilized more effectively to reduce the cost. In FIG. 8(C), the state prior to connecting the inner first tether 31 and the outer first tether 32 is shown for convenience of the explanation.

Lastly, a variation of the connection portion 13 will be described. FIG. 9 is a side view illustrating the variations of the connection portion 13 in which FIG. 9(A) shows a first variation, FIG. 9(B) shows a second variation, and FIG. 9(C) shows a third variation.

Figure 9A:
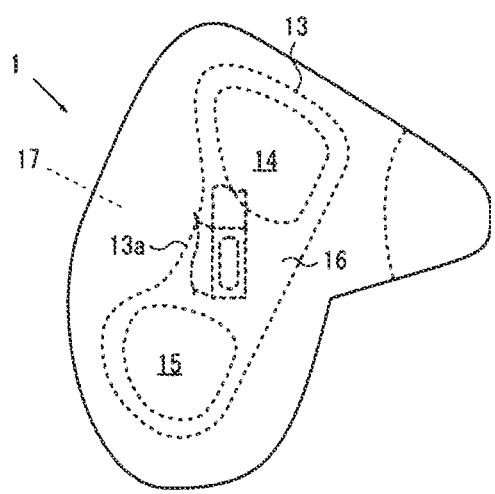
FIG. 9(A) shows a first variation.

The first variation of the connection portion 13 shown in FIG. 9(A) has a dent 13a formed substantially at the center of the sewn portion on the passenger P side. According to this configuration, the connection portion 13 can prevent the valley portion 17 from flattening, while the head portion of the passenger P can be effectively received by the dent 13a, thereby improving the impact absorbing force.

Figure 9B:
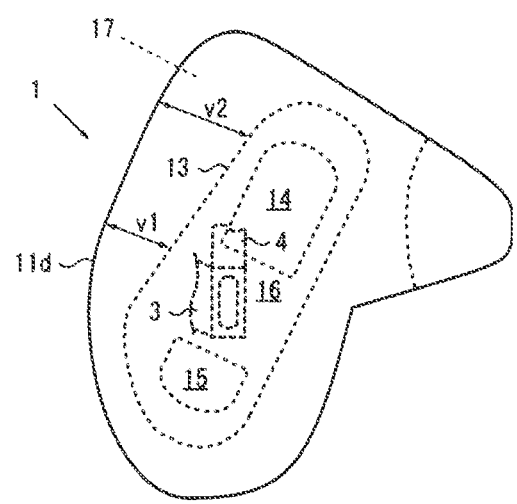
FIG. 9(B) shows a second variation.

The second variation of the connection portion 13 shown in FIG. 9(B) is formed such that a gap from the outer-peripheral sewn portion 11d of the airbag 1 (the left inflation chamber 11L and the right inflation chamber 11R) gets wider from below to above. Supposing that a gap from the outer-peripheral sewn portion 11d on the lower side is v1 and a gap from the outer-peripheral sewn portion 11d on the upper side is v2, a relationship of v2>v1 is established. According to this configuration, the valley portion 17 to which a load can be easily applied when the passenger P contacts the airbag 1 can be formed deep, and the passenger P can be received softly. Furthermore, in this variation, the inflated and deployed shape of the airbag 1 can be effectively regulated even if the valley portion 17 is made deep, since the first tether 3 and the second tether 4 are connected together.

Figure 9C:
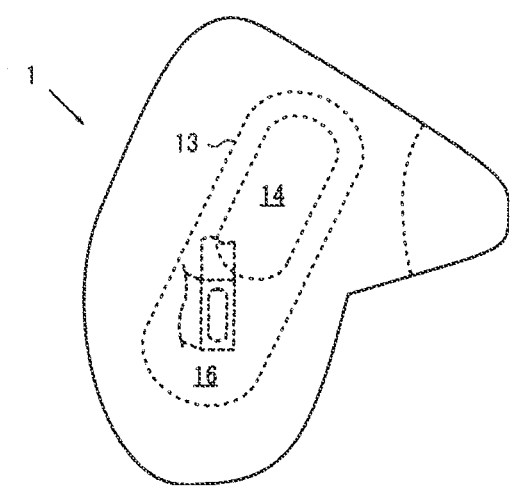
FIG. 9(C) shows a third variation.

The third variation of the connection portion 13 shown in FIG. 9(C) is configured such that only the second communication path 14 is formed within the connection portion 13. Thus, the third communication path 15 may be omitted. The connection portion 13 is formed in the ellipse shape arranged substantially in parallel with the inclination of a front face portion of the airbag 1 similarly to the first embodiment. In this variation, the base cloth remaining in the connection portion 13 when the second communication path 14 is formed forms the bridge portion 16. The positions of the second communication path 14 and the bridge portion 16 may be inverted, though not shown here.

The present invention is not limited to the above-described embodiments and can be applied to a driver airbag, a side airbag, a curtain airbag, a knee airbag other than the passenger airbag as long as it is a so-called twin-bag shaped airbag. It is needless to say that various changes are possible in a range not departing from the gist of the present invention such that the right and left inflation chambers may be upper and lower inflation chambers, three or more communication paths may be formed within the connection portion 13 and the like.

What is claimed is:

1. An airbag comprising:
a left inflation chamber that is inflated and deployed on the front left side of a passenger;
a right inflation chamber that is inflated and deployed on the front right side of the passenger from a car body upon supply of gas into the insides; said left inflation chamber and said right inflation chamber comprising:
a first communication path formed at an end portion of said car body side;
a connection portion connected at an intermediate portion in the inflating and deploying direction; and
a second communication path formed within the connection portion;
a first tether for each of the left and right inflation chambers with each of the first tethers having one end connected to an inner face of the corresponding left and right inflation chambers and the other end connected to the connection portion; and
a second tether for each of the left and right inflation chambers with each of the second tethers having one end connected to an inner face in the vicinity of the top portion of the corresponding left and right inflation chambers, and the other end connected to the connection portion or the other ends of the second tethers being directly connected together to form an intermediate tether portion that passes through the second connection path,
wherein a third communication path, which is separate from said second communication path, is formed within said connection portion, and at least the other end of said first tether is connected to a bridge portion formed between said second communication path and said third communication path.

2. The airbag according to claim 1, wherein said bridge portion is formed in a range of the height of ¼ to ¾ of the height of said airbag after inflation and deployment.

3. An airbag comprising:
a left inflation chamber that is inflated and deployed on the front left side of a passenger;
a right inflation chamber that is inflated and deployed on the front right side of the passenger from a car body upon supply of gas into the insides; said left inflation chamber and said right inflation chamber comprising:
a first communication path formed at an end portion of said car body side;
a connection portion connected at an intermediate portion in the inflating and deploying direction; and
a second communication path formed within the connection portion;
a first tether for each of the left and right inflation chambers with each of the first tethers having one end connected to an inner face of the corresponding left and right inflation chambers and the other end connected to the connection portion; and
a second tether for each of the left and right inflation chambers with each of the second tethers having one end connected to an inner face in the vicinity of the top portion of the corresponding left and right inflation chambers, and the other end connected to the connection portion or the other ends of the second tethers being directly connected together to form an intermediate tether portion that passes through the second connection path, wherein said second tether has one end connected to inner faces on outer shell sides of said left inflation chamber and said right inflation chamber and also connected to a range of 80 to 250 mm from an outer-peripheral sewn portion of said left inflation chamber and said right inflation chamber.

4. An airbag comprising:

a left inflation chamber that is inflated and deployed on the front left side of a passenger;

a right inflation chamber that is inflated and deployed on the front right side of the passenger from a car body upon supply of gas into the insides; said left inflation chamber and said right inflation chamber comprising:

a first communication path formed at an end portion of said car body side;

a connection portion connected at an intermediate portion in the inflating and deploying direction; and a second communication path formed within the connection portion;

a first tether for each of the left and right inflation chambers with each of the first tethers having one end connected to an inner face of the corresponding left and right inflation chambers and the other end connected to the connection portion; and a second tether for each of the left and right inflation chambers with each of the second tethers having one end connected to an inner face in the vicinity of the top portion of the corresponding left and right inflation chambers, and the other end connected to the connection portion or the other ends of the second tethers being directly connected together to form an intermediate tether portion that passes through the second connection path, wherein said first tether and said second tether are constituted by each side of a base cloth formed in the L shape.

5. The airbag according to claim 3, wherein said first tether or said second tether is formed by using a remaining part of a base cloth in said connection portion when said second communication path is formed.

6. The airbag according to claim 1, wherein said first tether or said second tether is formed by using a remaining part of a base cloth in said connection portion when said third communication path is formed.

7. The airbag according to claim 1, wherein said connection portion has a dent formed substantially at the center of a sewn portion on the passenger side or formed so that a gap from the outer-peripheral sewn portions of said left inflation chamber and said right inflation chamber gets wider from below to above.

8. The airbag according to claim 1, wherein said first communication path and said second communication path form a substantially doughnut-shaped gas communication path.

9. An airbag device having an airbag which is folded normally and inflated and deployed in an emergency and an inflator that supplies gas to the airbag, wherein said airbag is an airbag according to any one of claims 1-8.

* * * * *